Aug. 17, 1943.  L. F. RONAN  2,327,129
METHOD OF MAKING METAL CUTTING SAWS
Filed March 15, 1940   2 Sheets-Sheet 1

INVENTOR.
Leonard F. Ronan
by Parker, Rockwood & Farmer
ATTORNEYS.

Patented Aug. 17, 1943

2,327,129

UNITED STATES PATENT OFFICE 2,327,129

METHOD OF MAKING METAL CUTTING SAWS

Lerned F. Ronan, East Aurora, N. Y., assignor of one-half to George J. Ronan, Buffalo, N. Y.

Application March 15, 1940, Serial No. 324,055

4 Claims. (Cl. 29—95)

This invention relates to metal-cutting saws and more particularly to improvements in power-operated, high speed hack or metal-cutting saws and the method of making the same.

The saws used in power-operated metal sawing machines are ordinarily in the form of relatively narrow, toothed blades, and the blade is secured at its ends and stretched taut between the legs of a frame or yoke which is reciprocated to move the saw back and forth across the work or piece being cut. The saw frame is urged toward the work during the cutting stroke under a weight or pressure, which is considerable, in order to make the saw teeth take hold or bite into the work and cut with the required rapidity. This creates an upward pressure on the saw blade which more or less bows or bends the saw in an arc extending between the pivotal connections of the ends of the saw with the saw frame. The pressure which causes this bowing of the saw is relieved during the return stroke of the saw and, therefore, the saw blade tends to straighten out or resume its original straight condition during each return stroke. In a modern high speed metal-sawing machine the number of strokes or reciprocations of the saw per minute is considerable, and this rapid, alternate bowing and straightening of the saw causes rapid vibrations thereof which, it is believed, produce a fatigue or molecular change or sets up destructive strains in the metal of the blade, resulting in frequent breakages in saw blades as they have been made heretofore.

Metal cutting hack saws are not ordinarily resharpened, and in order that they may last and retain their cutting sharpness for a reasonable length of time, it is necessary for the teeth to be very hard. As a consequence, high speed hack saws made according to previous methods, in which the teeth have the necessary hardness, are so brittle and inflexible that they are frequently broken in the ordinary use thereof in power sawing machines.

An object of this invention is to produce a high speed metal-cutting saw, and especially a saw for power operation, made from a single integral body of metal in which the teeth have the necessary hardness to insure the required cutting life of the saw, but in which a portion or portions of the blade other than the toothed edge is/or are made or formed so as to increase the toughness, flexibility and tensile strength of the blade in a way to greatly reduce blade breakage in the use of such saws.

Other objects of the invention are to provide an improved method of making high speed metal-cutting saws having these characteristics; also to treat or process saw blades so that portions thereof other than their toothed edges are of softer, tougher character than the toothed edges of the blades, while being of great tensile strength, whereby the blades will not readily fracture, due to the fatigue or strains set up in the metal in the use of the saws; and also to provide a metal-cutting saw in which the blade is formed with portions of the metal thereof removed, or with perforations so disposed as to increase the flexibility and lessen the tendency of the blade to fracture, due to the fatigue or strains in the metal of the blade resulting from the use of the saw.

The above stated objects and specified improvements in metal-cutting saws may be accomplished according to this invention by heat treating the saw blade, as hereinafter described, so as to obtain the requisite hardness in the toothed edge of the blade and a lesser hardness but increased toughness and the required tensile strength in other portions of the blade; or by providing the blade with perforations or removing portions of the metal of the blade, as hereinafter explained; or by both perforating and heat treating the saw blade.

Additional objects and advantages of the invention will appear from the following specification of different embodiments of the invention, illustrated in the accompanying drawings, and the novel features thereof are set forth in the appended claims.

Figs. 4–9 inclusive are similar views, each illustrating another slightly modified form of the invention.

Figure 1:
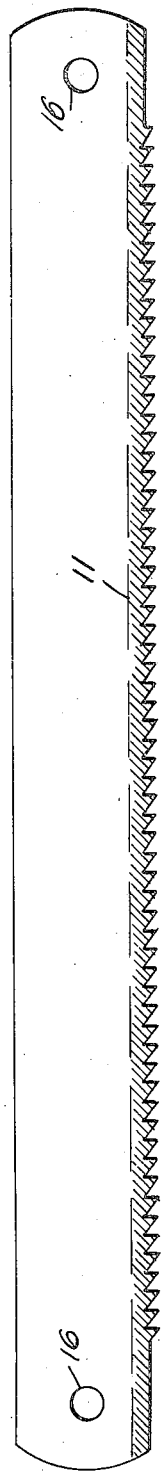
Fig. 1 is a side view of a high speed metal-cutting saw illustrating one embodiment of my invention, in which the portion of the blade extending from the back edge of the blade nearly to the teeth is of less hardness than the toothed portion.
Figure 2:
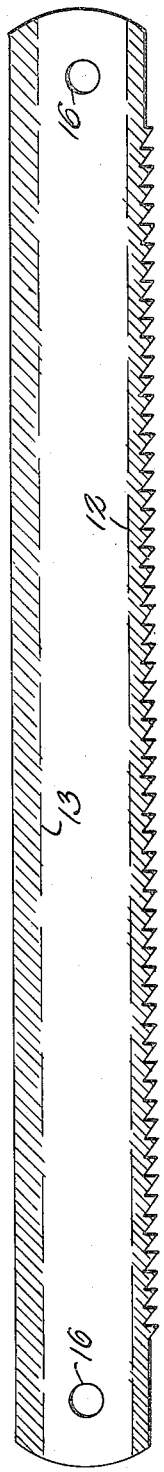
Fig. 2 is a similar view illustrating a modification of the invention, in which the central portion of the blade between the back edge portion and the toothed portion is of reduced hardness.
Figure 3:
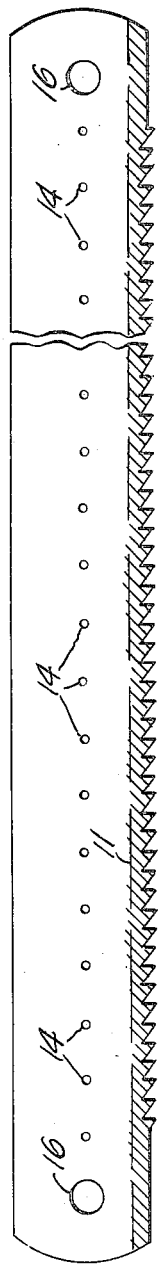
Fig. 3 is a similar view illustrating another modification, in which the portion of the blade of reduced hardness is perforated.

In Figs. 1, 2 and 3, the portions of the blade which differ in hardness are indicated by the plain and shaded areas in these figures.

Referring first to that embodiment of the invention in which the improved results are attained by heat treatment, the saw blade may be made from one of the well known kinds of high speed steel, such for example as high tungsten steel which contains around 18% tungsten, 4% chromium and 1% to 2% vanadium; or steel containing around 8% molybdenum and 2% tungsten. Such steels in the condition in which they are produced can be worked or machined as necessary to form the blades, cut and set the teeth thereof, etc. to complete the mechanical fabrication of the saw. After such fabrication, the blade may be treated in the usual way to secure the necessary hardness in the teeth. For example, the blade may be heated to a temperature from about 2175° F. to 2400° F., and then quenched in air or oil, after which the blade is drawn or tempered, as by heating it to a temperature from about 900° F. to 1120° F. Thus, a saw is produced having teeth of the requisite hardness for efficient high speed metal cutting.

Thereafter, in order to obtain the desired reduced hardness, increased toughness and flexibility of the saw blade, the portion of the blade extending from approximately the line of the inner ends of the teeth gullets to the back edge of the blade, or a longitudinal central zone only, extending part-way from approximately the line of the inner ends of the gullets to the back edge of the blade, is heat treated or annealed. The amount of heat applied and the length of the application of the heat are in proportion to the reduction in hardness, increase in toughness and flexibility and tensile strength desired in the treated portion of the blade. For example, if the portion of the blade being heat treated has a process heat of 1650° F. playing on it, it will soften up much sooner to the desired point than if treated at a lower temperature for the same length of time. In other words, as an example, and using the C Rockwell scale of hardness to illustrate, a C 45 hardness of the portion of the blade being treated can be obtained by soaking the blade at a temperature of about 1300° F. for a prolonged period of time, but this hardness reading of C 45 may be obtained more quickly by using a higher heat, such as 1500° F. to 1600° F.

By protecting the toothed edge of the blade from the heat while thus heat treating the remainder or central zone of the blade, the required hardness of the teeth, say of from C 61 to C 64 Rockwell, will be retained, while the portion of the blade which is heat treated may be reduced to a lower degree of hardness of, say C 35 Rockwell to C 58 Rockwell, as may be desired, depending upon the degree of toughness and the tensile strength desired. The toughness and tensile strength vary relatively to each other with variations in this range of hardness. For instance, treatment to one point of hardness may increase the toughness at the sacrifice of the tensile strength of the blade, whereas treatment to a different point of hardness may increase the tensile strength at the sacrifice of toughness. A treatment to give a hardness of approximately C 45 Rockwell for the softened portion of the blade is considered preferable for the best general results.

Instead of first hardening the whole blade throughout and then softening the portion or portions of the blade other than the toothed edge thereof, as above explained, the toothed edge portion only of the blade could be hardened to give the requisite hardness of the teeth by heating to a high temperature, quenching and then drawing or tempering this portion only of the blade, as above explained and, thereafter, while protecting the toothed edge portion of the blade to retain its hardness, the central longitudinal zone, or the portion of the blade extending from approximately the line of the inner ends of the gullets to the back edge of the blade, can be heat treated as explained, to obtain the degree of hardness, say between C 35 Rockwell and C 58 Rockwell, as desired.

In Fig. 1 of the drawings, the portion of the blade extending approximately from the broken line 11 of the inner ends of the gullets to the back edge of the blade has been treated as explained, so that it will have the desired hardness, less than the hardness of the teeth, for instance from C 35 Rockwell to C 58 Rockwell, while the toothed edge of the blade will have a hardness of say from C 61 Rockwell to C 64 Rockwell.

In Fig. 2, the toothed edge of the blade may have a similar hardness, say between C 61 and C 64 Rockwell, and the rear edge portion of the blade may have approximately the same hardness, while the central zone of the blade between the broken lines 12 and 13 will be of the desired lesser hardness of say between C 35 and C 58 Rockwell.

Fig. 3 of the drawings shows a slight modification of the Figs. 1 and 2 forms of the invention. As illustrated in Fig. 3, the blade is heat treated as above described to secure the reduced hardness, increased toughness and flexibility and tensile strength of a portion of the blade, as illustrated either in Fig. 1 or Fig. 2, but preparatory to this treatment, small spaced perforations are formed in the portion of the blade to be treated for reducing its hardness. The provision of these perforations 14 facilitates or quickens the heat treating process.

According to the embodiments of my invention illustrated in Figs. 4-9 inclusive, the flexibility of the blade is increased and the tendency of the same to fracture, due to the fatigue or strains set up in the metal by the vibrations of the blade occurring during its use, is reduced by removing small portions of the metal of the blade or providing perforations in the blade disposed in ways to accomplish these results.

Figure 4:
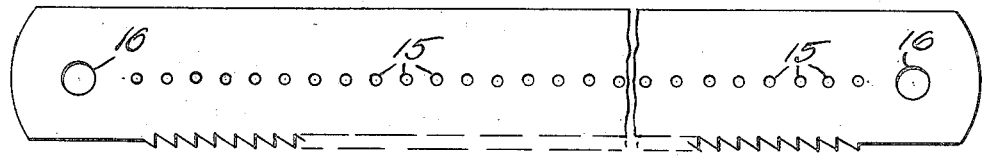

For this purpose, as shown in Fig. 4, the blade is provided with a series of small spaced perforations 15 arranged in a row extending longitudinally about midway of the width of the blade. These perforations are located between the holes 16, usually provided in the ends of the blade for securing the same in the saw frame.

Figure 5:
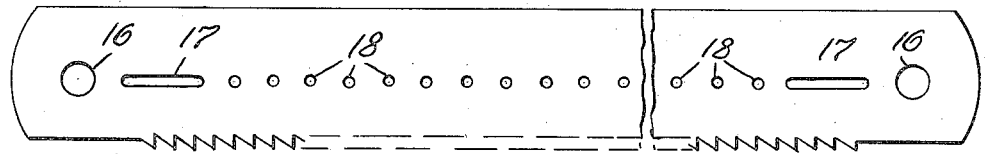

Fig. 5 illustrates a similar construction except that between and adjacent to the usual securing holes 16, the blade is provided near each end portion with a narrow, elongated slot 17 and with a longitudinal row of perforations 18 between the two slots 17. The slots 17 should have semi-circular or rounded ends.

Figure 6:
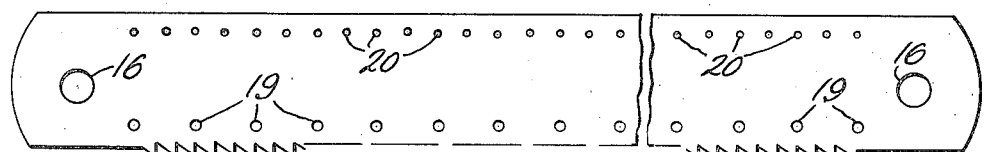

As shown in Figure 6, the blade is provided with one longitudinal row of small perforations 19 near the toothed edge of the blade and with a second row of small perforations 20 near the back edge of the blade. The perforations 20 are spaced closer together than the perforations 19, there preferably being twice as many perforations 20 as perforations 19.

Figure 7:
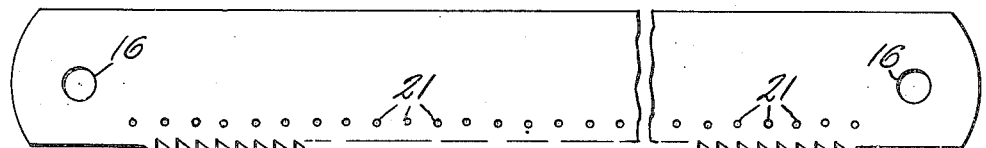

Fig. 7 shows a slightly modified arrangement of perforations 21, in which they are arranged in a single, longitudinal row adjacent to the toothed edge of the blade instead of midway between the front and back edges of the blade, as shown in Fig. 4.

Figure 8:
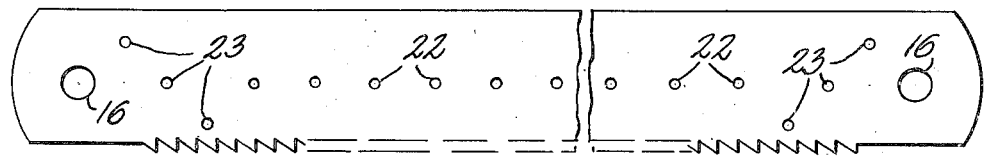

In the Fig. 8 modification, perforations 22 are arranged in a longitudinal row approximately midway between the front and rear edges of the blade. This row of perforations terminates some distance short of the securing holes 16 in the ends of the blade and, between each securing hole 16 and the adjacent end of the row of perforations 22 is formed a small group of perforations 23. This group of perforations may be disposed more or less transversely of the width of the blade, for instance in oblique rows, as illustrated in this figure. These end groups of perforations 23 add materially to the tortional or twisting flexibility of the blade adjacent to its connections with the saw frame and reduce the danger of fracture of the blade at these end portions, due to the tortional strains occurring at these points in the use of the blade.

Figure 9:
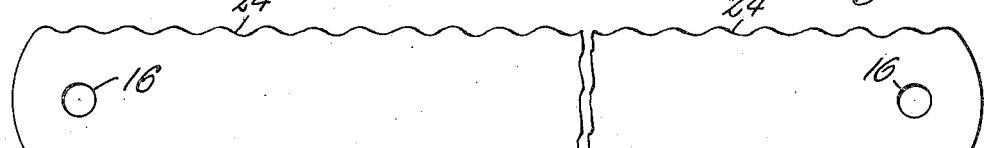

According to the modification illustrated in Fig. 9, the blade, instead of being perforated as shown in Figs. 4-8, has its back edge scalloped as indicated at 24. That is, small portions of the metal of the blade at its back edge are removed so as to form undulating or alternately rounded or convex and concave projections and depressions. This formation on the back edge of the blade gives greater strain relief area on the back edge of the blade, thus increasing the flexibility of the blade and reducing its tendency to fracture in use.

The embodiments of the invention above described and illustrated in Figs. 4-9 inclusive, in which the blades are perforated or have portions of the metal removed will, it is believed, substantially reduce the breakage of high speed metal-cutting saws without necessitating the previously described heat treatment thereof to reduce the hardness and increase the toughness of portions of the blades.

While previously in this specification, reference has been made to hack saws or saw blades intended to be operated by a reciprocating motion, it will be understood that the invention is applicable also to continuous or endless band saws for cutting metal, and that such band saws made or formed according to this invention would be improved in the respects hereinbefore mentioned and are comprehended within the scope of the invention.

I claim as my invention:

1. The method of making a high speed metal-cutting saw comprising fabricating a blade with a toothed edge and consisting of a single integral body of high speed steel of a composition throughout substantially as described, and then heat treating said blade to make said toothed edge of required hardness and make a longitudinal portion of the blade back of said toothed edge of less hardness than said toothed edge but of greater hardness than that of the steel before fabrication of the blade and not less than approximately C 35 on the Rockwell scale.

2. The method of making a high speed metal-cutting saw comprising fabricating a blade with a toothed edge and consisting of a single integral body of high speed steel of a composition throughout substantially as described, and then heat treating said blade to make said toothed edge of not less than approximately C 61 Rockwell hardness, and a longitudinal portion of the blade back of said toothed edge between approximately C 35 and C 58 Rockwell hardness.

3. The method of making a high speed metal-cutting saw comprising fabricating a blade with a toothed edge and consisting of a single integral body of high speed steel of a composition throughout substantially as described, and then heat treating said blade to make said toothed edge of not less than about C 61 Rockwell hardness, and a longitudinal portion of the blade back of said toothed edge of about C 45 Rockwell hardness.

4. The method of making a high speed metal-cutting saw comprising fabricating a blade with a toothed edge and consisting of a single integral body of high speed steel of a composition substantially as described, then heating at least the toothed edge portion of the blade to a temperature between about 2175° F. and about 2400° F., then quenching and tempering the blade to obtain a toothed edge having a hardness of not less than approximately C 61 Rockwell, and then reducing the hardness and increasing the toughness and flexibility of a longitudinal portion of the blade back of the toothed edge by annealing or soaking said longitudinal portion of the blade at a temperature between about 1300° F. and about 1600° F. until said portion of the blade has a hardness of between approximately C 35 and C 58 Rockwell.

LERNED F. RONAN.